Figure 1:
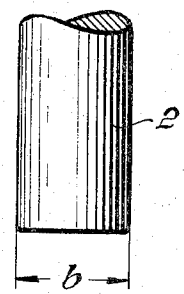
Figure 1:
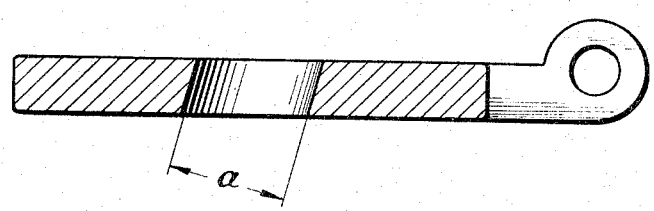

April 4, 1967  F. BRASELMANN  3,312,115
STEPPING MECHANISM FOR CAR JACK
Filed Dec. 30, 1964  2 Sheets-Sheet 1

INVENTOR
Ferdinand Braselmann
By: Dicke & Craig
ATTORNEYS

April 4, 1967 F. BRASELMANN 3,312,115
STEPPING MECHANISM FOR CAR JACK
Filed Dec. 30, 1964 2 Sheets-Sheet 2

INVENTOR
Ferdinand Braselmann
By Dicke & Craig
ATTORNEYS

United States Patent Office 3,312,115
Patented Apr. 4, 1967

3,312,115
STEPPING MECHANISM FOR CAR JACK
Ferdinand Braselmann, Ennepetal-Oberbauer, Westphalia, Germany, assignor to Ferd Braselmann, Ennepetal-Oberbauer, Westphalia, Germany
Filed Dec. 30, 1964, Ser. No. 422,145
Claims priority, application Germany, Jan. 3, 1964, B 74,888
10 Claims. (Cl. 74—141.5)

The present invention relates to a stepping mechanism by means of clamping plates for car jacks and other purposes.

In similar stepping mechanisms according to previous designs the clamping plates are provided with normal smooth bores to serve as passages for the bracing rod of the jack which the clamping plates are adapted to grip by being tilted relative thereto. For effecting this gripping or clamping operation as quickly and reliably as possible, these bores are designed so that the line which connects the two opposite clamping points on each clamping plate extends almost at a right angle to the axis of the bore. This requires one or both flat sides of the clamping plates to be provided with recesses which reduce the strength of the clamping plates and also have to be made with great accuracy. Furthermore, the load which a jack according to any of these prior designs should support must be applied thereon at a considerable distance from the bracing rod so as to insure that the leverage required for pivoting the clamping plates to the clamping position will be sufficient to effect a secure locking action of these plates on the bracing rod.

It is an object of the invention to provide a stepping mechanism for jacks and other purposes in which the two diametrically opposite clamping points of each clamping plate are spaced from each other in the axial direction of the bore through which the bracing rod extends. For this purpose, the two diametrically opposite clamping points on each clamping plate are provided in the bore adjacent to the flat outer surfaces of the clamping plate in the form of arcuate surfaces which have a common axis and a radius of curvature smaller than the radius of the bracing rod. These two arcuate surfaces adjacent to the upper and lower sides of each clamping plate are adapted to exert a tonglike clamping action upon the opposite sides of the bracing rod when during the pivoting movement of the clamping plate from its inclined position toward its more horizontal clamping position the arcuate surfaces are shifted substantially radially over the bracing rod. An important advantage of the clamping plates according to the invention over those previously employed for similar purposes is the fact that even though only a small load might be applied upon one side of the clamping plates, a very strong and secure clamping effect will be attained. The clamping plates may therefore be made of a very short length which has the advantage that the stepping mechanism and thus also the entire jack may be made of a relatively small size.

A further advantage of the new stepping mechanism over similar mechanisms as previously employed consists in the fact that in the clamping position the clamping points of each clamping plate no longer have a purely linear contact with the bracing bar but that they are enlarged so as to form clamping surfaces and that therefore the loading capacity and the length of service of this mechanism are considerably increased.

The features and advantages of the present invention will become more clearly apparent from the following detailed description thereof which is to be read with reference to the accompanying drawings, in which—

Figure 2:
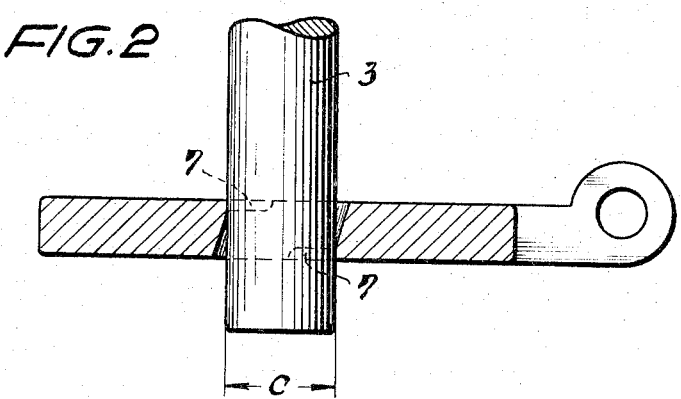
Figure 3:
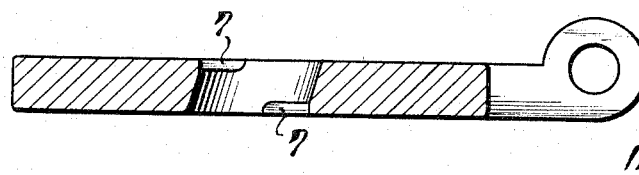
Figure 4:
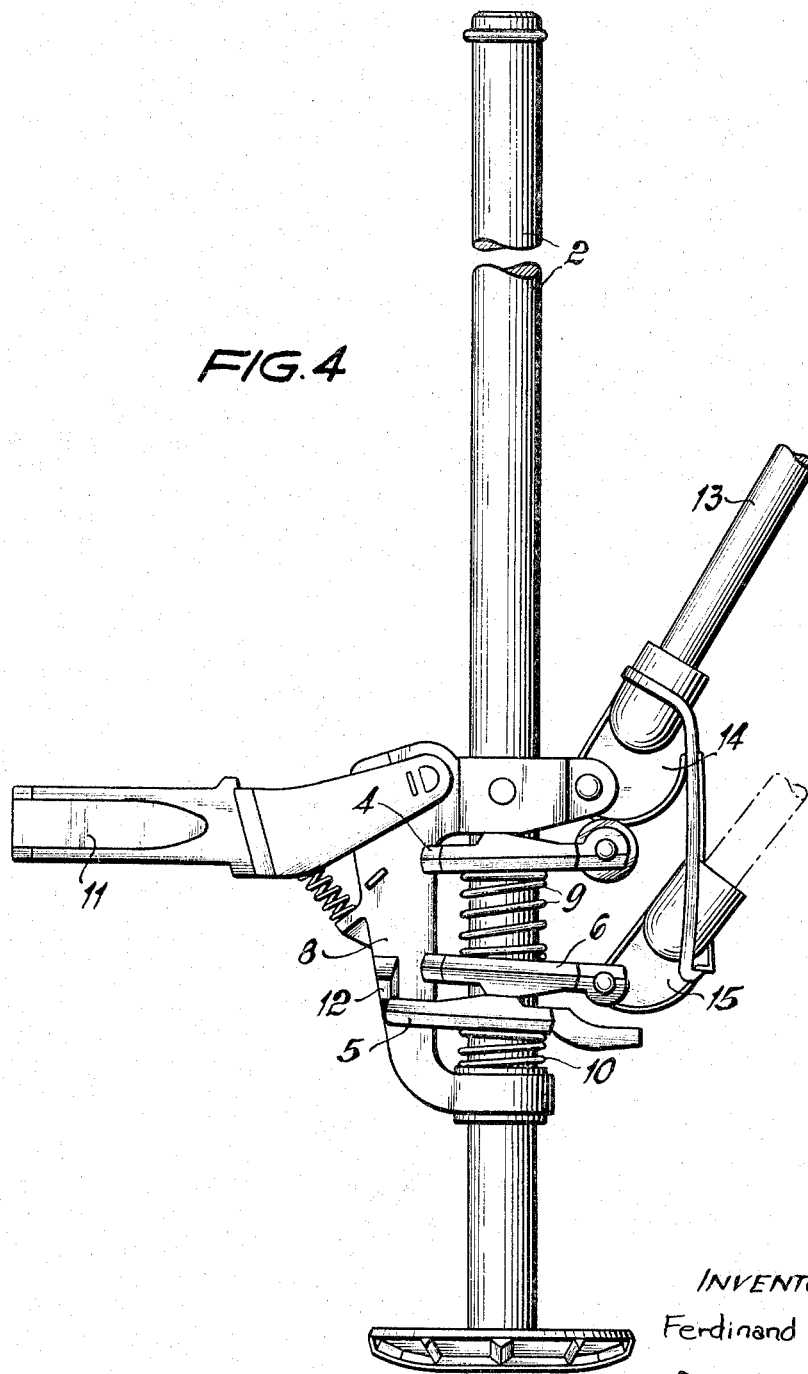

FIGURES 1 to 3 illustrate the manner of producing the stepping mechanism according to the invention as well as the important features thereof; while FIGURE 4 shows a car jack which includes the stepping mechanism according to FIGURES 1 to 3.

The jack as illustrated in FIGURE 4 is of substantially the same type as that shown in the patent to Braselmann 2,820,608 for a "Lifting Device" issued Jan. 21, 1958, to the present inventor. The operator of the jack according to the present invention and the operation of the above-mentioned patent is substantially identical; therefore, the jack structure and operation will not be discussed in detail. The present description will primarily be related to a specific configuration of the clamping plate bores, which is the subject matter of the present invention. The clamping plates of the present invention may be employed in the jack according to the above-mentioned Braselmann patent. The jack of the present invention is provided with three clamping plates or members 4, 5, and 6 which are slidable along the bracing bar 2 between the arms of a U-shaped bracket 8 on which they are guided so as not to turn relative to each other about the axis of the bracing bar 2. For moving the clamping plates into their clamping positions, the upper and central clamping plates 4 and 6 are separated by a coil spring 9 and the lower clamping ring 5 is separated from the lower arm of the bracket 8 by a coil spring 10. The load, for example, of a car, which is to be supported by the jack is to be applied on an arm 11 on the bracket 8 and it is transmitted by the latter and a cam 12 to the lower clamping ring 5 which is thereby pivoted and clamped tightly on the bracing bar 2. For hoisting the load, the handle bar 13 is inserted into the eccentric member 14 which is pivotably mounted on the upper arm of the bracket 8 and acts upon a roller on the end of the upper clamping plate 4. At every downward stroke of the handle bar 13, the load resting on the arm 11 will then be lifted to an extent equal to the pivoting movement of the eccentric member.

The stepping mechanism of the jack for lifting and lowering a load operates very reliably and accurately due to the inventive design of its three clamping plates 4, 5, and 6. As shown particularly in FIGURE 1, each of these clamping plates is provided with a bore or hole $a$ which has a diameter larger than that of the bracing bar 2. The axis of each of these bores $a$ preferably extends slightly obliquely to the flat outer front and rear surfaces of the clamping plates so that, when the stepping mechanism is assembled, the bracing bar 2 will extend vertically to each clamping plate in its clamping position. A bolt 3 which has a slightly smaller diameter $c$ than the bracing bar 2 is then inserted through the inclined bore in each clamping plate. When this bolt 3 is then erected by force from its inclined position in accordance with the inclination of the bore $a$ to the position as shown in FIGURE 2, it will press against the diagonally opposite edge portions of the bore at the upper and lower sides of the clamping plate and deform these edge portions into surfaces 7, which have a greater curvature and smaller radius than the bar 2. The vertical walls of these surfaces are spaced horizontally from each other at a distance slightly smaller than the diameter of the bracing bar 2 and form a passage for the latter so that, when the bracing bar 2 is inserted through the hole $a$ in the inclined direction thereof and a pressure is then exerted upon the right end of the clamping plate, as shown in FIGURE 2, the surfaces 7 will exert a secure clamping or gripping action upon the bracing bar 2. Obviously, instead of forming the clamping surfaces 7 in the manner as above described, it is also possible to form them in any other suitable manner, for example, by milling.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a stepping mechanism for a jack or other purposes comprising a bracing bar, and clamping plates each having a bore of a diameter larger than that of said bar, said bar extending through said bores in said clamping plates, the outer edge portions of the wall of each bore being out of concentricity with the wall of each bore at diametrically opposite points so as to form arcuate clamping surfaces, said surfaces together forming a single passage having a diameter smaller than that of said bar and having an axis differing from the axis of said bore.

2. A stepping mechanism as defined in claim 1, wherein said bore in each of said clamping plates has an axis extending at an oblique angle to the axis of said passage.

3. A machine element, comprising: a generally round bracing bar; a rigid clamping member having internal surfaces extending substantially in a first axial direction defining a generally round hole receiving said bracing bar; said internal surfaces having a front generally annular edge portion and a rear generally annular edge portion; said front annular edge portion having an arcuate first clamping surface extending substantially in a second axial direction that forms a substantial angle with said first axial direction; said rear annular edge portion having an arcuate second clamping surface extending substantially in said second axial direction and being on the diametrically opposed side of said hole from said first clamping surface; and each of said first and second clamping surfaces having a greater curvature than the adjacent portion of said bracing bar to engage said bracing bar with spaced surface portions.

4. The device of claim 3, wherein said bracing bar and said hole are cylindrical; said first and second clamping surfaces define spaced cylinder portions having a common axis that intersects the axis of said hole at a substantial angle; the radius of said hole is larger than the radius of said bracing bar; and the radius of said bracing bar is larger than the radius of said clamping surfaces.

5. The device of claim 4, wherein each of said clamping surfaces extends only about substantially one-half of the circumference of said hole, and said clamping surfaces are axially spaced from each other.

6. The device of claim 5, including a load bearing bracket member axially slidably attached to said bracing bar adjacent said clamping member; a second clamping member substantially identical to said first-mentioned clamping member being axially slidably mounted on said bracing bar; said second clamping member and said load bearing bracket having axially abutting portions and means resiliently connecting them together; said abutting portions, said resilient means and said second clamping member constituting means for substantially preventing movement of said load bearing bracket member in one axial direction relative to said bracing bar and freely allowing movement of said load bearing bracket member in the other axial direction relative to said bracing bar; and means drivingly connecting said first clamping member and said load bearing bracket member for selectively moving said load bearing member in the other axial direction relative to said bracing bar.

7. The device of claim 3, wherein each of said clamping surfaces extends only about substantially one-half of the circumference of said hole, and said clamping surfaces are spaced axially from each other.

8. The device of claim 7, including a load bearing bracket member axially slidably attached to said bracing bar adjacent said clamping member; a second clamping member substantially identical to said first-mentioned clamping member being axially slidably mounted on said bracing bar; said second clamping member and said load bearing bracket having axially abutting portions and means resiliently connecting them together; said abutting portions, said resilient means and said second clamping member constituting means for substantially preventing movement of said load bearing bracket member in one axial direction relative to said bracing bar and freely allowing movement of said load bearing bracket member in the other axial direction relative to said bracing bar; and means drivingly connecting said first clamping member and said load bearing bracket member for selectively moving said load bearing bracket member in the other axial direction relative to said bracing bar.

9. The device of claim 3, including a load bearing bracket member axially slidably attached to said bracing bar adjacent said clamping member; a second clamping member substantially identical to said first-mentioned clamping member being axially slidably mounted on said bracing bar; said second clamping member and said load bearing bracket having axially abutting portions and means resiliently connecting them together; said abutting portions, said resilient means and said second clamping member constituting means for substantially preventing movement of said load bearing bracket member in one axial direction relative to said bracing bar and freely allowing movement of said load bearing bracket member in the other axial direction relative to said bracing bar; and means drivingly connecting said first clamping member and said load bearing bracket member for selectively moving said load bearing bracket member in the other axial direction relative to said bracing bar.

10. The device of claim 9, wherein said bracing bar and said hole are cylindrical; said first and second clamping surfaces define spaced cylinder portions having a common axis that intersects the axis of said hole at a substantial angle; the radius of said hole is larger than the radius of said bracing bar; and the radius of said bracing bar is larger than the radius of said clamping surfaces.

References Cited by the Examiner

UNITED STATES PATENTS

| | | | |
|---|---|---|---|
| 1,007,360 | 10/1911 | Knight | 72—340 |
| 1,499,755 | 7/1924 | Stebbins | 248—355 X |
| 2,045,327 | 6/1936 | Laemmel | 72—340 |
| 2,141,778 | 12/1938 | Wenn | 74—531 |
| 2,731,842 | 1/1956 | Braselmann | 74—141.5 |
| 2,820,608 | 1/1958 | Braselmann | 74—141.5 X |
| 2,823,551 | 2/1958 | Utz | 74—141.5 |

FOREIGN PATENTS 722,819　2/1955　Great Britain.

MILTON KAUFMAN, *Primary Examiner.*

CHARLES W. LANHAM, JR., *Examiner.*

L. A. LARSON, *Assistant Examiner.*